United States Patent Office 3,483,382
Patented Dec. 9, 1969

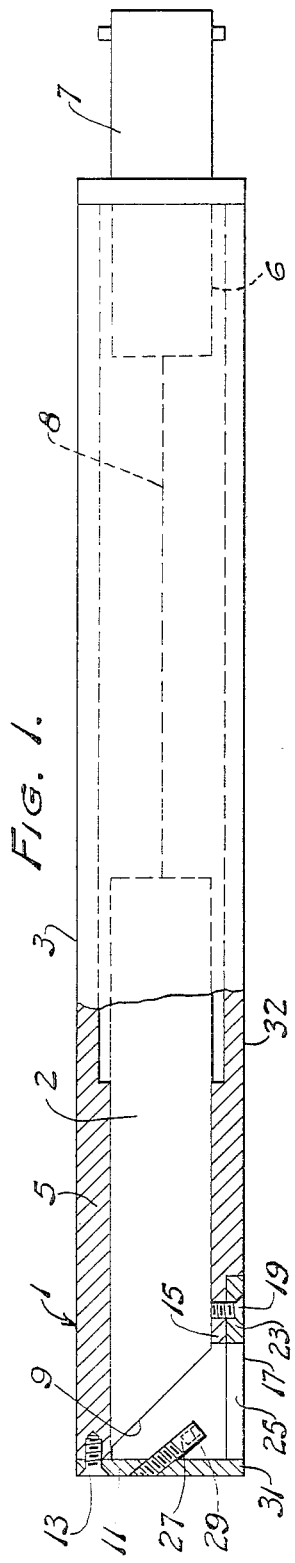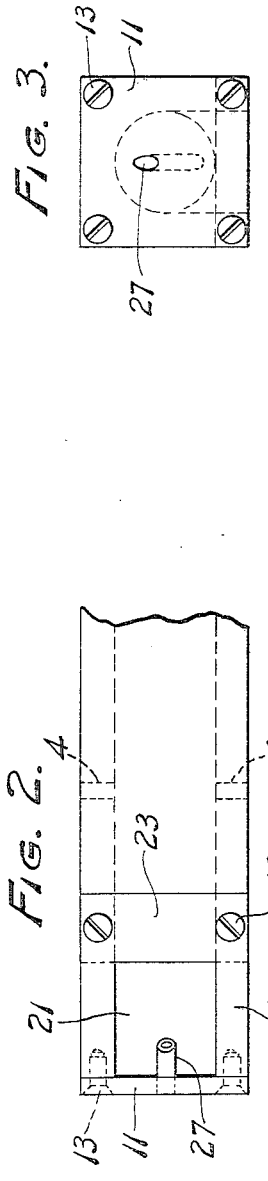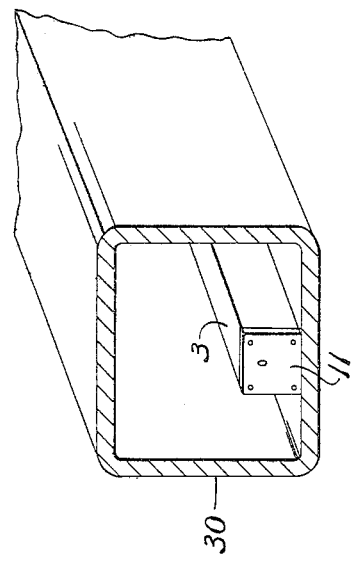

3,483,382
SELF-STABILIZING PORTABLE PROBE FOR MEASURING THICKNESS UTILIZING RADIATION
Boris B. Joffe, Buffalo, and John E. Tiebor, Tonawanda, N.Y., assignors to Twin City Testing Corporation, Tonawanda, N.Y.
Filed Dec. 23, 1965, Ser. No. 516,003
Int. Cl. G21h 5/00; H01j 39/00
U.S. Cl. 250—106                                5 Claims

ABSTRACT OF THE DISCLOSURE

A self stabilizing portable probe has a surface engaging side wall with an exposure opening therethrough. A radiation source mounted on the housing is alined with the opening for transmitting radiation therethrough against a test area. A radiation detector carried by the housing has a radiation receiving window alined with the exposure opening for receiving backscatter radiation from a test area through the opening. The housing side wall supports and stabilizes the probe with the opening in abutting relation with the test area.

---

This invention relates generally to the art of measuring thicknesses utilizing radiation techniques, and in particular to a new and useful portable measuring probe having inherent stabilization and alignment characteristics.

It is known that when beta rays hit a body, a certain portion of them are reflected. The intensity of the reflected beta rays is a function of the atomic number of the body. If the body is coated, the intensity of beta ray backscatter will be proportional to the thickness of the coating. Therefore, such beta ray backscatter can be used to measure the thickness of a coating, and this measurement technique offers many advantages, particularly in the measurement of ultra-thin coatings.

However, the accuracy of measurement using this technique requires an abutting relation between the test area and the probe head around the exposure aperture through which radiation is transmitted and reflected throughout the time interval required for measurement. Unless the test area is delimited in this manner, it becomes variable and error results.

Accordingly, it is a primary object of the present invention to provide a compact, readily portable probe for measuring coating thicknesses utilizing radiation backscatter techniques, which prob is so constructed that the probe is self-stabilizing in abutting relation to the test area during the time interval required for measurement.

It is another object of this invention to provide a portable measuring probe of the foregoing type which is particularly adapted for measuring coating thicknesses on flat surfaces and which requires no manipulation, other than placement on the flat test area, to maintain the probe surface around the exposure opening in contiguous, abutting stabilized relation with the test area.

A further object of our invention is to provide a portable measuring probe having the foregoing characteristics and also having a slender shape adapting it for measuring coating thicknesses on relatively inaccessible, confined areas.

The foregoing and other objects, advantages and characterizing features of the compact portable measuring probe of our invention will become clearly apparent from the ensuing detailed description of an illustrative embodiment thereof, considered in conjunction with the accompanying drawing illustrating the same wherein like reference numerals denote like parts throughout the various views and wherein:

FIG. 1 is a view, partly in side elevation and partly in vertical section, showing a portable measuring probe of our invention;

FIG. 2 is a fragmentary, bottom plan view of the measuring probe shown in FIG. 1;

FIG. 3 is an end elevational view of the measuring probe of FIG. 1; and

FIG. 4 is a fragmentary perspective view showing the measuring probe of FIG. 1 in use within a wave guide.

Referring now in detail to the accompanying drawing, there is shown a portable measuring probe generally designated 1 comprising an elongated housing 3 of rectangular cross section having a longitudinal passage therethrough. At its left-hand end, as seen in FIG. 1, housing 3 has an internal cylindrical bore 5 adapted to receive a radiation detector in the form of a cylindrical G-M tube 2 which is secured within housing 3 by set screws 4 or other suitable means. Electrical connections 8 extend between tube 2 and a series resistance 6. An electrical socket 7 of conventional design is detachably mounted on one end of housing 3, closing the passage therethrough, being connected to resistance 6 and adapted for connection with a readout unit, not shown. The other end of tube 2 is positioned adjacent the left-hand end of housing 3, as viewed in FIG. 1, and is provided with a window 9 disposed obliquely to the longitudinal axis of the housing. An end plate 11 is secured to that end of housing 3, adjacent window 9, by suitable means such as screws 13.

An exposure opening is provided in the underside of housing 3, adjacent the left-hand end thereof as viewed in FIG. 1, for passage of radiation therethrough. It is desirable that the area and configuration of such opening be variable, to accommodate different test area sizes and shapes, and that the external test area engaging surface surrounding such opening be maintained in flush abutting relation with the surface being measured. To this end, the bottom wall of housing 3 terminates short of end plate 11, being cut away below window 9 to leave an opening aligned therewith. The adjacent end of the housing bottom wall is stepped, as shown at 15 in FIG. 1, to provide a downwardly facing seat for receiving a platen 17 in flush relation to the bottom wall of housing 3.

Platen 17 is shown as a flat, U-shaped member having a transverse portion 23 adapted to be releasably secured on seat 15 by screws 19 and two forwardly extending side portions 25, although other platen configurations can be used. The forward ends of sides 25 abut plate 11.

The platen portions 23 and 25 together with end plate 11 define an exposure opening 21 for passage of radiation therethrough. Platens having exposure openings 21 of different sizes and geometrical configurations may be interchanged with platen 17 and secured in place on the underside of housing 3. In addition, each platen is so constructed and secured to housing 3 as to form, with the lower portion 31 of end plate 11 and the flat underside 32 of housing 3, a continuous flat surface. Because the platen 17 is coplanar with the underside of probe 1, probe 1 is adapted to rest on a flat surface with the surface engaging portions 31, 25 and 23 around the exposure opening directly abutting the test surface.

A radiation source holder 27 is screw threaded, or otherwise adjustably mounted in end plate 11, and is disposed at an oblique angle to end plate 11 and to the longitudinal axis of housing 3, having a cupped end 29 pointing in the direction of exposure opening 21. An interchangeable source of radiation is disposed in cup 29. In the present form, the source emits beta radiation although other forms of radiation may be utilized.

Window 9 of the radiation counter 1 is disposed at an oblique angle directly above exposure opening 21 and receives radiation backscatter reflected from a test area, the intensity of such backscatter being translated into coating thickness measurements by means known in the art. The disposition of source holder 27 in end plate 11 and the obliqueness of source holder 27 and window 9 relative to exposure opening 21 and the longitudinal axis of housing 3 provides a highly efficient arrangement. Excellent results have been achieved with both window 9 and source holder 27 disposed at 45° angles to opening 21, although other angles and combinations thereof may be utilized.

It is an important feature of this invention that the flat underside of housing 3 adapts the probe for efficient coating thickness measurements on flat surfaces. For example, where it is necessary to determine the coating thickness of an internal surface of a rectangular conduit, such as wave guide 30 shown in FIG. 4, probe 1 is placed within wave guide 30 in a manner positioning exposure opening 21 directly over the test area. The flat underside 32 of housing 3, containing exposure opening 21, rests against the flat interior surface of wave guide 30 and maintains the exterior test area engaging surface of platen 17 and the bottom portion 31 of plate 11 in flush abutting relation to the test area at all portions therealong thereby precluding radiation leakage therebetween. Further, stabilization of the probe relative to the test area is achieved for the duration of the time interval required for an accurate backscatter count.

Moreover, the flat surface of housing 3 and the slender, elongated configuration thereof particularly adapts the measuring probe of the present invention for measuring coating thickness on areas which are relatively inaccessible, of which the interior of a narrow wave guide is but one example. The coating thickness on a flat, upstanding wall also can be easily measured by holding the probe thereagainst, the necessary alignment, stabilization, and abutting relation between the test wall and the exterior surfaces of platen 17 and portion 31 of plate 11 being inherently provided by the flat, external underside 32 of housing 3.

While platens having flat, exterior surfaces are preferred, platens having other exterior surface shapes can be used. For example, the underside 32 of housing 3, the external surface of the platen, and the bottom 31 of end wall 11 could be curved to corresponding to a curved cylindrical surface to be measured.

From the foregoing, it is apparent that there is provided a shelter, elongated readily portable radiation measuring probe adapted to measure relatively inaccessible coating thicknesses and which is stabilized inherently in contiguous abutting relation with the test area at all times during measurement.

Having thus described and illustrated a presently preferred embodiment of our invention, it will be understood that such detailed description and illustration is by way of example only, and thus such modifications and changes as suggest themselves to those skilled in the art are intended to fall within the scope of the appended claims.

I claim:

1. A slender self-stabilizing portable probe for measuring coating thickness on a test area comprising an elongated housing having a surface engaging side wall, means substantially confined within said housing providing an exposure opening through said side wall, a radiation source holder mounted on said housing and aligned with said opening, a radiation source disposed within said holder for transmitting radiation through said opening against a test area, and a radiation detector carried by said housing and having a window aligned with said opening for receiving backscatter radiation reflected from a test area through said opening, said housing side wall supporting and stabilizing said probe with said opening means in abutting relation with the test area, wherein said window is disposed at an oblique angle to the longitudinal axis of said housing, and to said exposure opening, and wherein said source holder is directed at an oblique angle to the longitudinal axis of said housing and to said exposure opening.

2. A probe according to claim 1 wherein said side wall comprises a flat surface.

3. A probe according to claim 1 wherein said means includes a removable platen secured to said housing in flush relation with said side wall.

4. A probe according to claim 1 wherein said means and said window are disposed adjacent one end of said housing, said housing including an end member and means mounting said radiation source holder in said end member.

5. A probe according to claim 4 wherein said means providing an exposure opening includes a removable platen secured to said housing in flush relation with said side wall.

References Cited

UNITED STATES PATENTS 2,964,631  12/1960  Foster _____ 250—105 X
3,115,577  12/1963  Joffe et al.
3,143,886  8/1964  Lippke.

ARCHIE R. BORCHELT, Primary Examiner

U.S. Cl. X.R.

250—83, 105